United States Patent
Nishiyama

(10) Patent No.: US 10,764,227 B2
(45) Date of Patent: Sep. 1, 2020

(54) COMMUNICATION APPARATUS

(71) Applicant: KYOCERA Document Solutions Inc., Osaka (JP)

(72) Inventor: Masahiro Nishiyama, Osaka (JP)

(73) Assignee: KYOCERA DOCUMENT SOLUTIONS INC., Osaka (JP)

(*) Notice: Subject to any disclaimer, the term of this patent is extended or adjusted under 35 U.S.C. 154(b) by 410 days.

(21) Appl. No.: 15/723,839

(22) Filed: Oct. 3, 2017

(65) Prior Publication Data

US 2018/0115507 A1    Apr. 26, 2018

(30) Foreign Application Priority Data

Oct. 26, 2016 (JP) ................................ 2016-209843

(51) Int. Cl.
*G06F 15/16* (2006.01)
*H04L 12/58* (2006.01)

(52) U.S. Cl.
CPC ............ *H04L 51/28* (2013.01); *H04L 51/02* (2013.01); *H04L 51/063* (2013.01); *H04L 51/22* (2013.01); *H04L 51/26* (2013.01)

(58) Field of Classification Search
None
See application file for complete search history.

(56) References Cited

U.S. PATENT DOCUMENTS

| | | | | |
|---|---|---|---|---|
| 2009/0119758 A1* | 5/2009 | Tsuchiya | ................ | H04L 51/28 726/5 |
| 2009/0254858 A1* | 10/2009 | McCaffrey | ........... | G06Q 10/107 715/810 |
| 2013/0204952 A1* | 8/2013 | Everton | .................. | H04L 51/16 709/206 |
| 2015/0089417 A1* | 3/2015 | Dayan | ................. | G06F 16/9558 715/765 |
| 2017/0139557 A1* | 5/2017 | Heo | .................... | G06F 3/04817 |

FOREIGN PATENT DOCUMENTS

| | | |
|---|---|---|
| JP | 2001-142808 A | 5/2001 |
| JP | 2003-6116 A | 1/2003 |
| JP | 2008-252399 A | 10/2008 |

OTHER PUBLICATIONS

Japanese Office Action dated Jun. 11, 2019, issued to Japanese Application No. 2016-209843.

* cited by examiner

*Primary Examiner* — Mohamed Ibrahim
(74) *Attorney, Agent, or Firm* — Stein IP, LLC

(57) ABSTRACT

A communication apparatus includes an operation display unit for displaying an email generation screen containing content of an opponent machine-generated email as an original message input in a message input field, and for receiving an operation to input a new message, and a control unit for generating own machine-generated email containing email text of the input message. The control unit performs a signature process to insert an own machine user's signature in case where the original message does not contain the own machine user's signature, while it does not perform the signature process in case where the original message contains the own machine user's signature.

5 Claims, 9 Drawing Sheets

EMAIL TEXT OF OWN MACHINE-GENERATED EMAIL

EMAIL TEXT OF OPPONENT MACHINE-GENERATED EMAIL

MESSAGE INPUT IN MESSAGE INPUT FIELD

EMAIL TEXT OF OWN MACHINE-GENERATED EMAIL (REPLY EMAIL)

COMMUNICATION APPARATUS

INCORPORATION BY REFERENCE

This application is based upon and claims the benefit of priority from the corresponding Japanese Patent Application No. 2016-209843 filed Oct. 26, 2016, the entire contents of which are hereby incorporated by reference.

BACKGROUND

The present disclosure relates to a communication apparatus for sending and receiving electronic mail.

Conventionally, a communication apparatus that sends and receives electronic mail to and from an opponent machine is known.

The conventional communication apparatus has an automatic signature insertion function for automatically inserting own machine user's signature in electronic mail text. The conventional communication apparatus stores a destination registered in advance and the own machine user's signature in association with each other. Further, when sending electronic mail to the opponent machine (hereinafter referred to as own machine-generated email), the conventional communication apparatus inserts the signature associated with the destination of the own machine-generated email in the email text.

SUMMARY

A communication apparatus according to a first aspect of the present disclosure includes a storage unit, a communication unit, an operation display unit, and a control unit. The storage unit stores an own machine user's signature registered in advance. The communication unit receives opponent machine-generated email sent from an opponent machine. The operation display unit displays an email generation screen containing content of the opponent machine-generated email as an original message input in a message input field when receiving an instruction to generate reply email to the opponent machine-generated email, and receives an operation to input a new message in the message input field. The control unit performs an email generation process to generate own machine-generated email containing email text of the message input in the message input field, and controls the communication unit to send the own machine-generated email to the opponent machine. When performing the email generation process, the control unit determines whether or not the original message input in the message input field contains the own machine user's signature, and performs a signature process to insert the own machine user's signature in the email text of the own machine-generated email in case where the original message does not contain the own machine user's signature, while it does not perform the signature process in case where the original message contains the own machine user's signature.

A communication apparatus according to a second aspect of the present disclosure includes a storage unit, a communication unit, an operation display unit, and a control unit. The storage unit stores an own machine user's signature registered in advance. The communication unit receives opponent machine-generated email sent from an opponent machine. The operation display unit displays an email generation screen containing content of the opponent machine-generated email as an original message input in a message input field when receiving an instruction to generate reply email to the opponent machine-generated email, and receives an operation to input a new message in the message input field. The control unit performs an email generation process to generate own machine-generated email containing email text of the message input in the message input field, and controls the communication unit to send the own machine-generated email to the opponent machine. When performing the email generation process, the control unit determines whether or not the original message input in the message input field contains the own machine user's signature, and performs a signature process to insert the own machine user's signature above the original message in the email text of the own machine-generated email in case where the original message does not contain the own machine user's signature, while it deletes the own machine user's signature contained in the original message and performs the signature process in case where the original message contains the own machine user's signature.

DETAILED DESCRIPTION

<Structure of Communication Apparatus>

Figure 1:
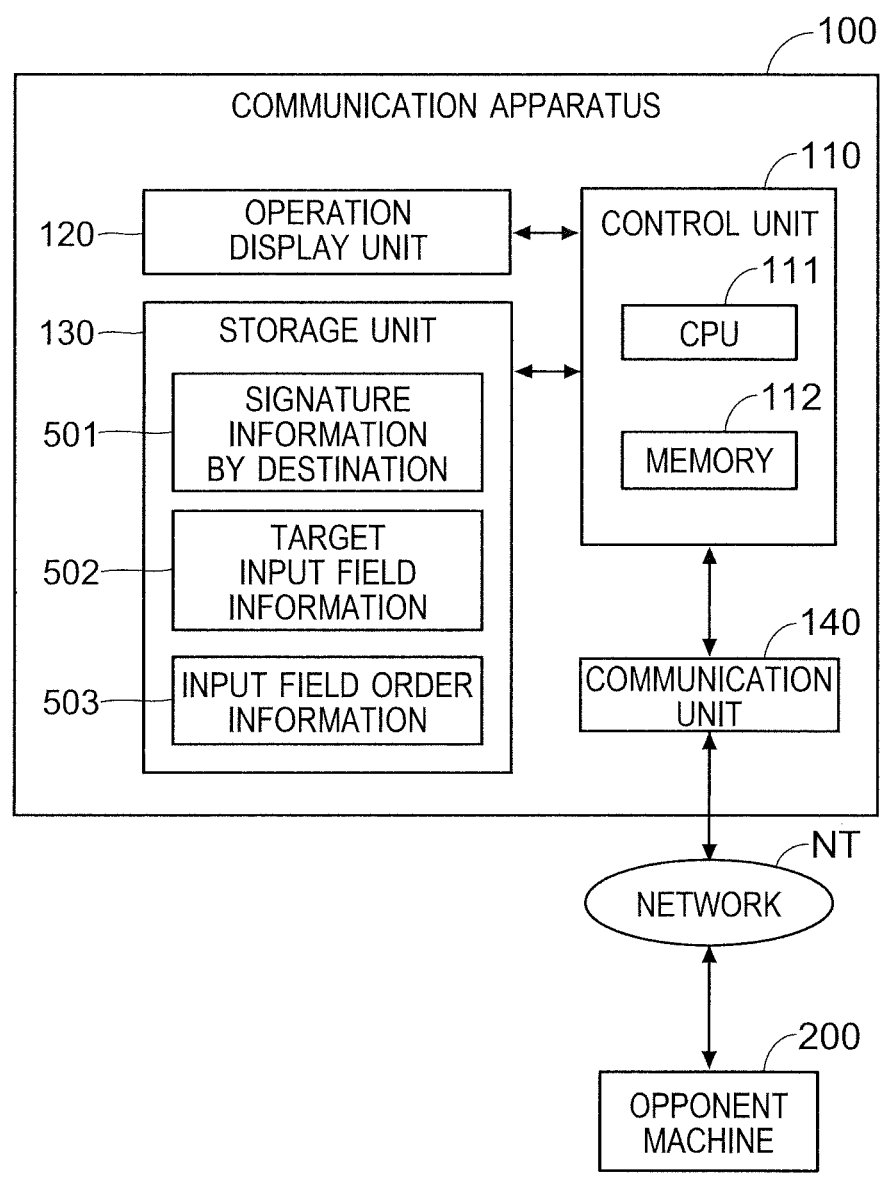
FIG. 1 is a diagram showing a structure of a communication apparatus according to an embodiment of the present disclosure.

As illustrated in FIG. 1, a communication apparatus 100 of this embodiment sends and receives electronic mail (hereinafter referred simply to as email) to and from an opponent machine 200 connected in a communicable manner via a network NT such as the Internet.

The communication apparatus 100 is a note-type or desktop-type personal computer (PC). Otherwise, the communication apparatus 100 is a mobile terminal such as a smartphone or a tablet terminal. In addition, the communication apparatus 100 may be an image forming apparatus (such as a multifunction peripheral) having an email function for sending and receiving email. The opponent machine 200 is an apparatus such as a PC or a mobile terminal having the email function.

The communication apparatus 100 includes a control unit 110, an operation display unit 120, a storage unit 130, and a communication unit 140.

The control unit 110 includes a CPU 111 and a memory 112 (ROM and RAM). The CPU 111 operates on the basis of a control program and data so as to control the communication apparatus 100. The memory 112 stores a control program and data for operating the CPU 111. In addition, the memory 112 stores email software installed in the communication apparatus 100.

The operation display unit 120 displays screens and receives input operations. The display operation of the operation display unit 120 is controlled by the control unit 110. In addition, input operations with the operation display unit 120 are detected by the control unit 110.

Note that the operation display unit 120 may be divided into a display device for displaying screens and an input device for receiving input operations. For example, in case where the communication apparatus 100 is a PC, a display device such as an LCD and an input device such as a hardware keyboard or a pointing device constitute the operation display unit 120. In case where the communication apparatus 100 is a mobile terminal, a touch panel display constitutes the operation display unit 120.

The storage unit 130 includes a nonvolatile storage device such as a ROM. The control unit 110 reads data from the storage unit 130 and writes data to the storage unit 130. For example, the storage unit 130 stores signature information by destination 501, target input field information 502, input field order information 503, and the like. The information stored in the storage unit 130 will be described later in detail.

The communication unit 140 is a network interface for connecting the communication apparatus 100 to the opponent machine 200 via the network, and includes a communication circuit, a memory, and a connector. For example, in order to access the network NT via a wireless LAN access point, a wireless LAN module for performing wireless LAN communication is provided as the communication unit 140 to the communication apparatus 100.

The communication unit 140 is controlled by the control unit 110 so as to send and receive email to and from the opponent machine 200. In other words, the communication unit 140 sends own machine-generated email generated by the communication apparatus 100 to the opponent machine 200. In addition, the communication unit 140 receives opponent machine-generated email generated by the opponent machine 200 and sent from the opponent machine 200.

<Sending and Reception of Email>

Figure 2:
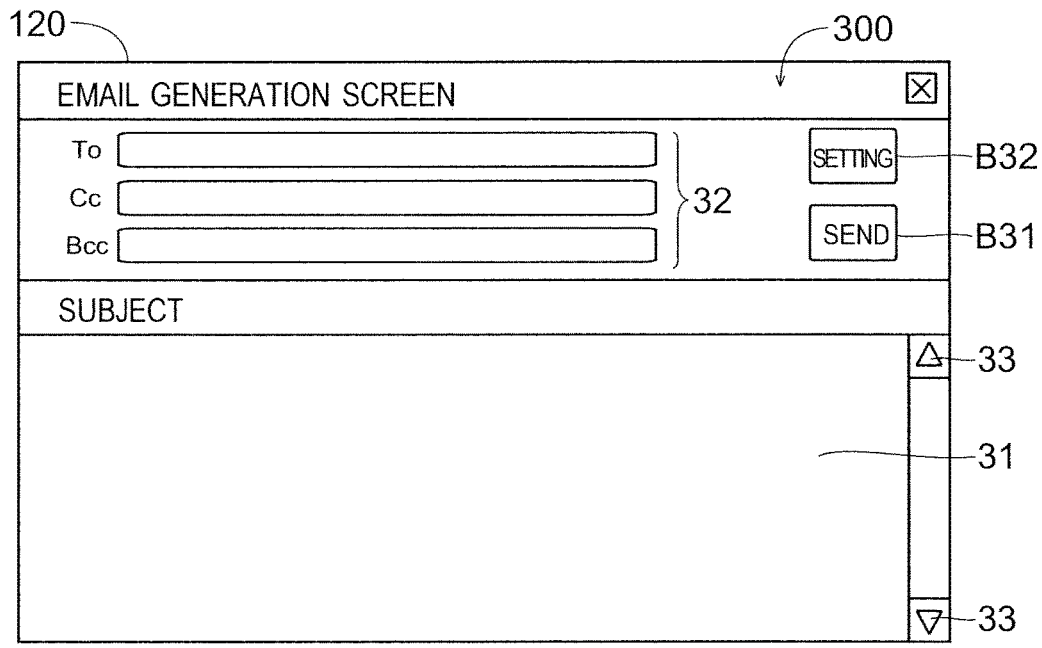
FIG. 2 is a diagram showing an email generation screen displayed by the communication apparatus according to an embodiment of the present disclosure.

When the operation display unit 120 receives an operation for starting the email software installed in the communication apparatus 100, the control unit 110 controls the operation display unit 120 to receive a message input operation for inputting a message (email text) and a destination input operation for inputting a destination (email address). In this case, the operation display unit 120 displays an email generation screen 300 as shown in FIG. 2 and receives the message input operation and the destination input operation from an own machine user (a user of the communication apparatus 100).

A message input field 31 as an area for inputting a message (email text) and destination input fields 32 for inputting destinations are arranged in the email generation screen 300. Note that in the email generation screen 300, a plurality of input fields (a To field, a Cc field, and a Bcc field) corresponding to a plurality of destination types including To, Cc (carbon copy), and Bcc (blind carbon copy) are arranged as the destination input fields 32.

To input a message in the message input field 31 is performed by the message input operation (an operation to the operation display unit 120), and to input a destination in the operation destination input field 32 is performed by the destination input operation (an operation to the display unit 120). Note that scroll buttons 33 (an up button and a down button) are arranged in the message input field 31. By operating this scroll button 33, the message input in the message input field 31 can be scrolled up and down.

A send button B31 is arranged in the email generation screen 300. When the control unit 110 detects an operation to the send button B31, it generates own machine-generated email including email text of the message input in the message input field 31 (performs an email generation process). Further, the control unit 110 controls the communication unit 140 to send the own machine-generated email to the destination (opponent machine 200) input in the destination input field 32.

In addition, a setting button B32 is arranged in the email generation screen 300. When an operation to the setting button B32 is performed, the control unit 110 controls the operation display unit 120 to display a setting screen (not shown) for receiving setting about the email function. In this setting screen, for example, it is possible to set whether or not to automatically insert an own machine user's signature in the email text of the own machine-generated email (ON/OFF of a signature insertion function). Note that the own machine user's signature is registered in advance by the own machine user. Registration of the own machine user's signature is received by the operation display unit 120.

Figure 3:
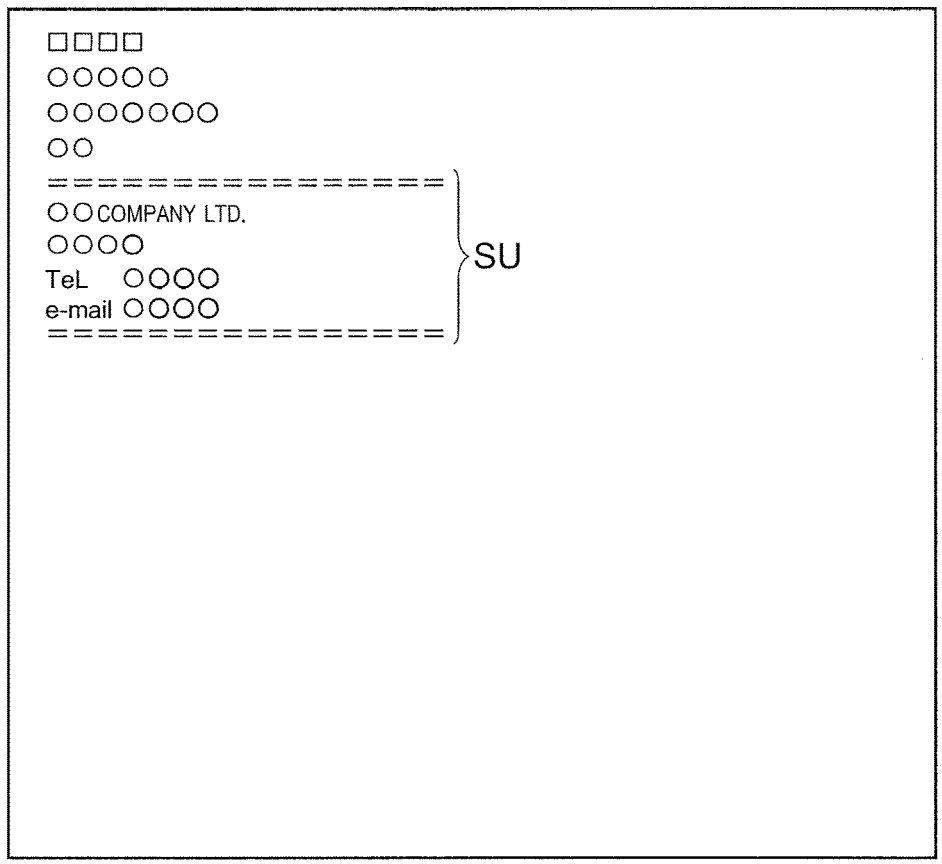
FIG. 3 is a diagram showing email text of own machine-generated email generated by the communication apparatus according to an embodiment of the present disclosure.

As one process of the email generation process, the control unit 110 performs a signature process, in which ON/OFF setting of the signature insertion function is checked, and the own machine user's signature is inserted in the email text of the own machine-generated email when the signature insertion function is set to ON. FIG. 3 shows an example of the email text of the own machine-generated email in which the own machine user's signature is inserted. In the following description, the own machine user's signature is denoted by a symbol "SU".

For example, although not shown, the control unit 110 controls the operation display unit 120 to display a confirmation screen after performing the signature process. In this confirmation screen, email text of the own machine-generated email in which the own machine user's signature SU is inserted is displayed. In this case, the operation display unit 120 displays a message to urge the user to confirm the email text of the own machine-generated email (own machine user's signature SU) in the confirmation screen. In addition, the operation display unit 120 receives an instruction whether or not to send the own machine-generated email of the content of the email text being displayed in the confirmation screen. Further, when the operation display unit 120 receives an instruction to send, the control unit 110 controls the communication unit 140 to send the own machine-generated email. On the contrary, when the operation display unit 120 receives an instruction not to send, the control unit 110 controls the communication unit 140 not to send the own machine-generated email. In this case, the email generation screen 300 may be displayed again, and the message input operation or the destination input operation may be received.

Figures 4, 5:
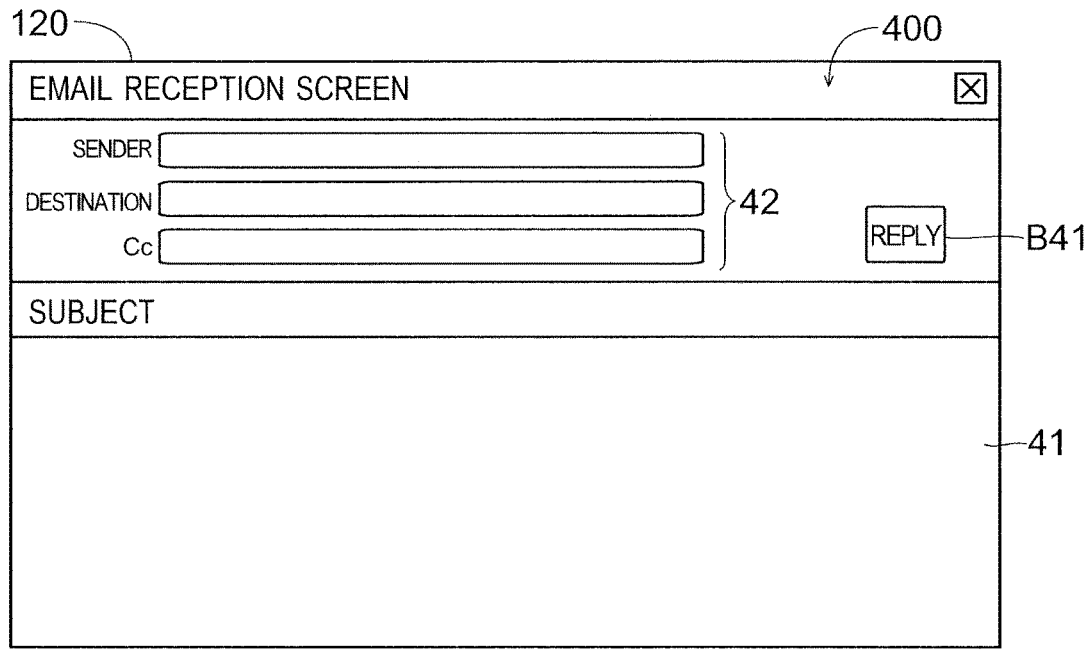
FIG. 4 is a diagram showing an email reception screen displayed by the communication apparatus according to an embodiment of the present disclosure.
FIG. 5 is a diagram showing email text of opponent machine-generated email generated by an opponent machine that communicates with the communication apparatus according to an embodiment of the present disclosure.

In addition, after the communication unit 140 receives the opponent machine-generated email sent from the opponent machine 200, when the operation display unit 120 is operated for displaying the opponent machine-generated email (received email), the control unit 110 controls the operation display unit 120 to display an email reception screen 400 as shown in FIG. 4.

A message display field 41 as an area for displaying email text of the opponent machine-generated email and a header information display field 42 as an area for displaying header information of the opponent machine-generated email are arranged in the email reception screen 400. A sender, a destination, a Cc recipient, and the like are displayed in the header information display field 42.

Note that in case where the own machine-generated email received by the opponent machine 200 is quoted in the email text of the opponent machine-generated email (in case where the opponent machine-generated email is reply email to the own machine-generated email), the email text of the opponent machine-generated email contains content of the own machine-generated email as an original message. The original message contains header information and email text of the own machine-generated email. FIG. 5 shows an example of the email text of the opponent machine-generated email in this case.

FIG. 5 shows a case where the own machine-generated email containing the email text shown in FIG. 3 is quoted in the email text of the opponent machine-generated email. In the following description, the original message contained in the email text of the opponent machine-generated email is denoted by symbol "M1", and the header information of the own machine-generated email contained in the original message M1 is denoted by symbol "H1".

In addition, a reply button B41 is arranged in the email reception screen 400 shown in FIG. 4. When an operation to the reply button B41 is performed, the control unit 110 detects the operation as an instruction to generate reply email to the opponent machine-generated email.

Figure 6:
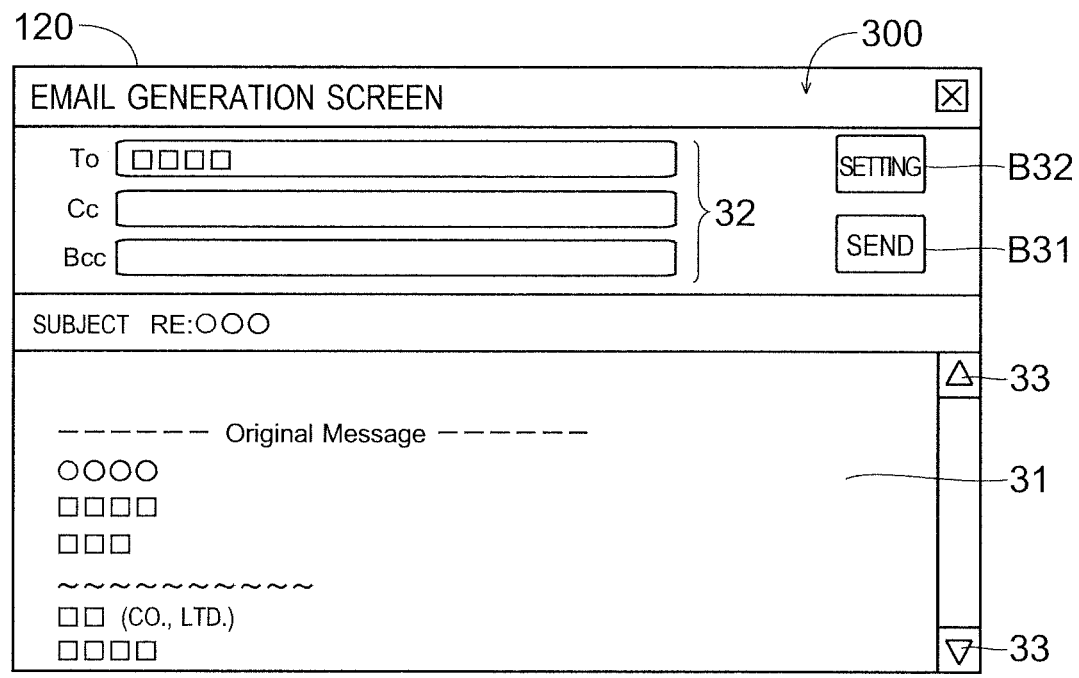
FIG. 6 is a diagram of a state where an original message is input in a message input field of the email generation screen displayed by the communication apparatus according to an embodiment of the present disclosure.
Figure 7:
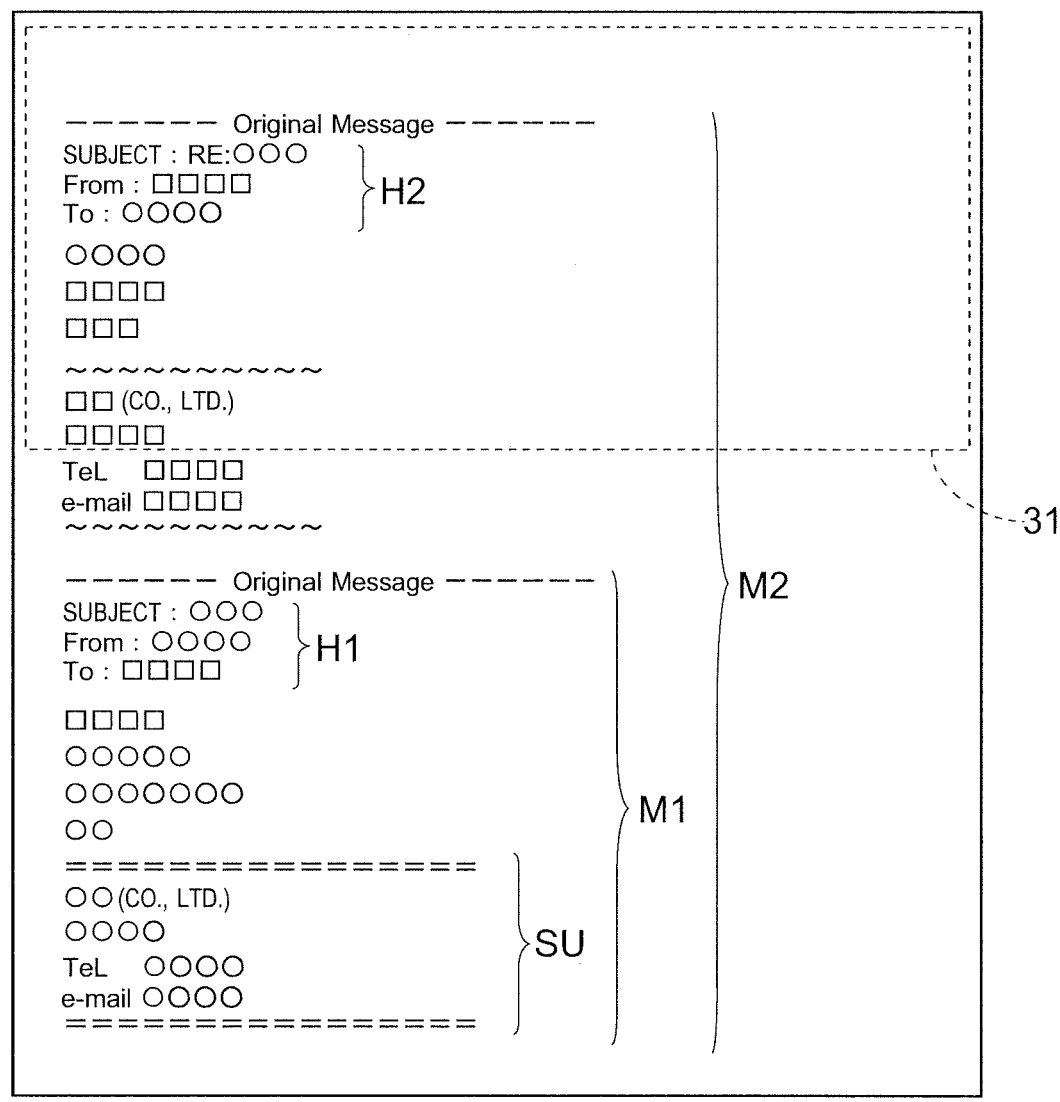
FIG. 7 is a diagram showing an original message input in the message input field of the email generation screen displayed by the communication apparatus according to an embodiment of the present disclosure.

When the control unit 110 detects the instruction to generate reply email, it controls the operation display unit 120 to display the email generation screen 300 in the state where content of the opponent machine-generated email is input in the message input field 31 as the original message as shown in FIG. 6. For example, in case where the opponent machine-generated email is quoted when generating the reply email to the opponent machine-generated email containing the email text shown in FIG. 5, the original message as shown in FIG. 7 (the message indicating content of the opponent machine-generated email) is input in the message input field 31. In the following description, the original message indicating content of the opponent machine-generated email is denoted by symbol "M2", and the header information of the opponent machine-generated email contained in the original message M2 is denoted by symbol "H2".

Note that in case where the message input in the message input field 31 has a large number of lines, only a part of the email text is displayed in the message input field 31, and other part is not displayed in the message input field 31 unless a scroll button B33 is operated (see FIG. 6). However, FIG. 7 shows the whole part of the message input in the message input field 31, for convenience sake.

The original message M2 input in the message input field 31 contains content of the own machine-generated email received by the opponent machine 200. In other words, the original message M2 input in the message input field 31 contains the same message as the original message M1 shown in FIG. 5 (the message indicating content of the own machine-generated email). Therefore, the own machine user's signature SU is already input in the message input field 31.

When reply email to the opponent machine-generated email is generated, the message input operation is performed with the email generation screen 300 so that a new message is input in the message input field 31 in the state where the original message M2 is already input. Then operation to the send button B31 is performed.

The control unit 110 controls the operation display unit 120 to display the email generation screen 300 by trigger of the operation to the reply button B41. After that, when the operation to the send button B31 is performed, an email generation process is performed so as to generate the own machine-generated email (reply email) having email text containing the original message M2 input in the message input field 31 and a new message.

In this case, the control unit 110 performs a first email generation process or a second email generation process. For example, the communication apparatus 100 is configured to perform only one of the first email generation process and the second email generation process. Alternatively, the communication apparatus 100 may be configured so that the own machine user can select whether to perform the first email generation process or the second email generation process.

<First Email Generation Process>

When the control unit 110 performs the first email generation process, it determines whether or not the original message M2 input in the message input field 31 contains the own machine user's signature SU. Further, when the original message M2 does not contain the own machine user's signature SU, the control unit 110 performs the signature process to insert the own machine user's signature SU in the email text of the own machine-generated email. Note that, although not shown, when the control unit 110 performs the signature process, it inserts the own machine user's signature SU above the original message M2.

Figure 8:
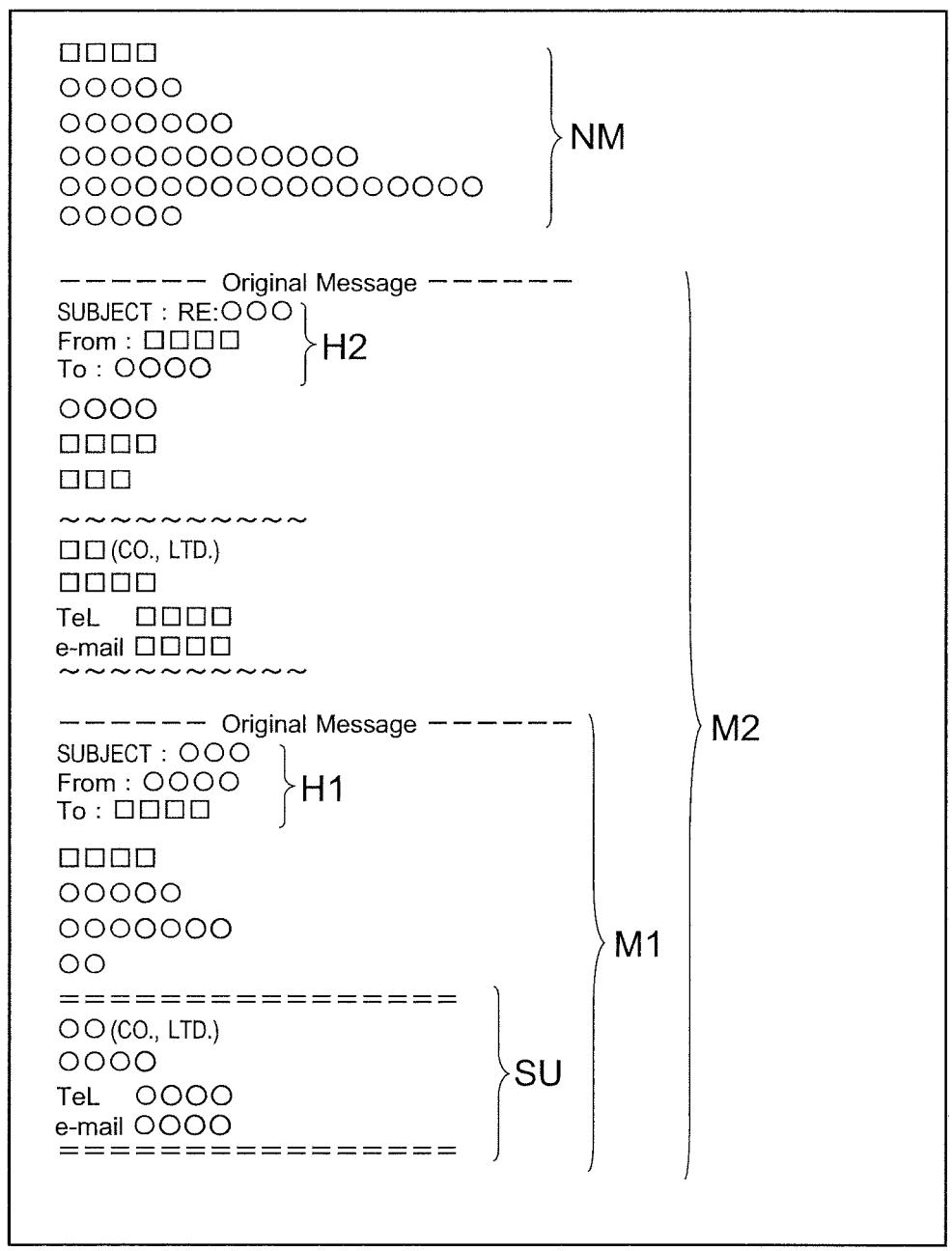
FIG. 8 is a diagram showing email text of own machine-generated email (reply email) generated by the communication apparatus according to an embodiment of the present disclosure.

On the contrary, when the original message M2 contains the own machine user's signature SU, the control unit 110 does not perform the signature process. In this case, as shown in FIG. 8, the email text having the own machine user's signature SU existing only in the original message M2 is generated as the own machine-generated email (reply email). In FIG. 8, the message input newly by the message input operation is denoted by symbol "NM".

For example, the storage unit 130 stores setting about the signature process by the control unit 110 (signature setting). Note that the signature setting is performed by the own machine user, and the signature setting is received by the operation display unit 120.

When the signature setting is first setting, the control unit 110 performs the signature process in case where the original message M2 does not contain the own machine user's signature SU, while it does not perform the signature process in case where the original message M2 contains the own machine user's signature SU. In other words, the control unit 110 performs the signature process only when the opponent machine-generated email received from the opponent machine 200 is new email and the own machine-generated email is to be sent to the opponent machine 200 as the reply email to the new email (opponent machine-generated email). Note that even if the opponent machine-generated email is the reply email to the own machine-generated email, when the original message M1 is deleted from the email text of the reply email (opponent machine-generated email), the reply email is handled as new email.

When the signature setting is second setting (when it is set to determine whether or not to perform the signature process on the basis of the number of reply times of sending the own machine-generated email as the reply email to the opponent machine 200), the control unit 110 determines the number of reply times of sending the own machine-generated email as the reply email to the opponent machine 200. Further, when the number of reply times will become an integral multiple of a predetermined number (that is two or more) after this time reply to the opponent machine 200, the control unit 110 performs the signature process even if the original message M2 contains the own machine user's signature SU. For example, when the predetermined number is three, every time when the number of reply times becomes an integral multiple of three after the first reply to the opponent machine 200, the control unit 110 performs the signature process.

Note that when the reply to the opponent machine 200 is repeated many times, the number of header information H1 of the own machine-generated email contained in the original message M2 is increased. In other words, the number of header information H1 of the own machine-generated email contained in the original message M2 corresponds to the number of reply times. Therefore, for example, the control unit 110 determines the number of reply times on the basis of the number of header information H1 of the own machine-generated email contained in the original message M2.

When the signature setting is third setting (when it is set to determine whether or not to perform the signature process on the basis of the number of lines in the original message M2 input in the message input field 31), the control unit 110 determines the number of lines (for example, the number of line feeds) of the original message M2 input in the message input field 31. Further, when the number of lines in the original message M2 is a predetermined threshold value or more, the control unit 110 performs the signature process even if the original message M2 contains the own machine user's signature SU.

Note that, when the signature setting is fourth setting (when it is set to perform the signature process every time in the email generation process), the control unit 110 performs the signature process regardless that the original message M2 contains the own machine user's signature SU or not.

Figure 9:
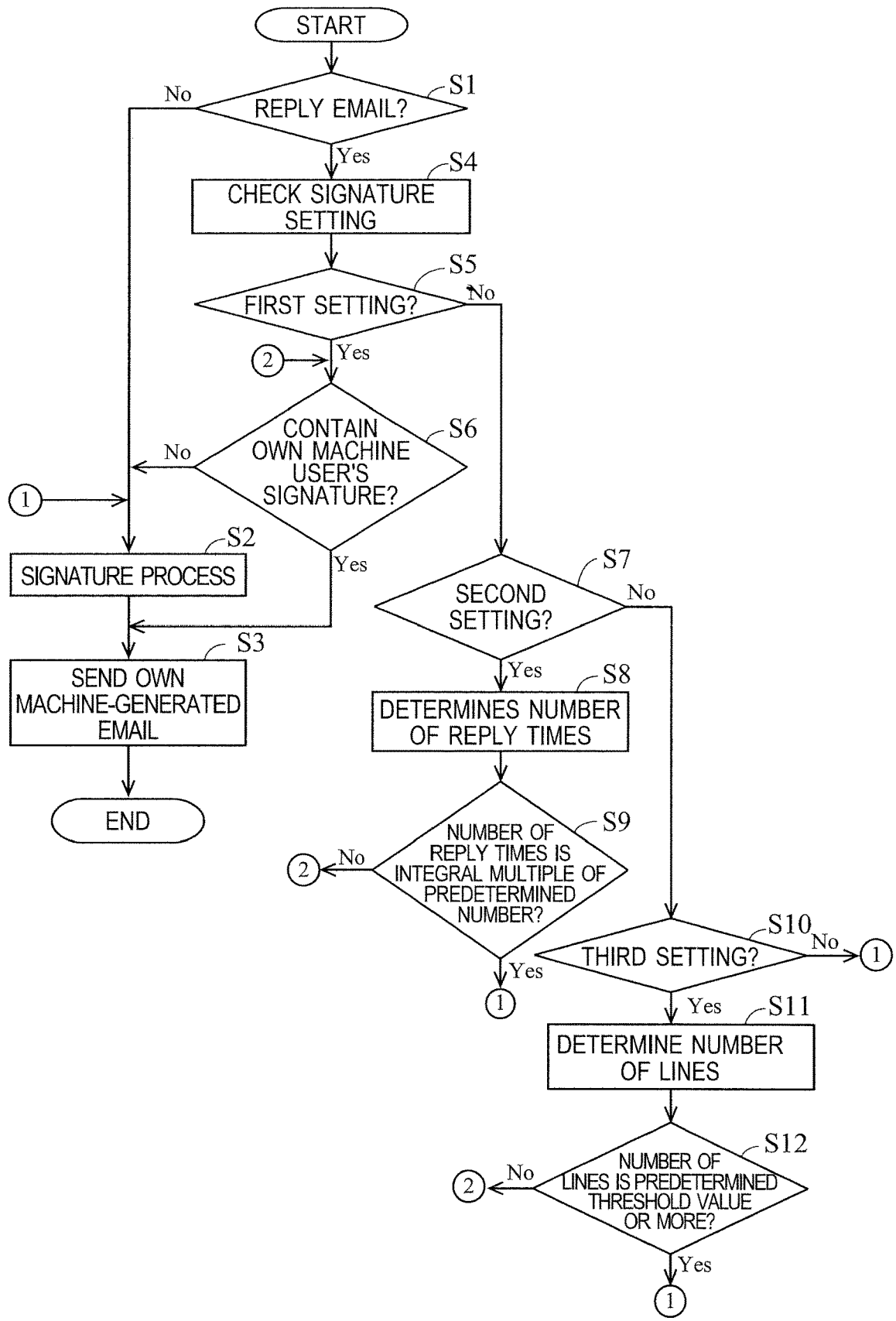
FIG. 9 is a flowchart showing a process flow when the communication apparatus according to an embodiment of the present disclosure performs a first email generation process.

Hereinafter, with reference to the flowchart shown in FIG. 9, a flow of the first email generation process is described. The flowchart shown in FIG. 9 starts when the send button B31 in the email generation screen 300 is operated (when the email generation process is started). It is supposed that the ON/OFF setting of the signature insertion function is set to ON at the time point when the flowchart shown in FIG. 9 starts. In case where the ON/OFF setting of the signature insertion function is set to OFF, the process according to the flowchart shown in FIG. 9 is not performed (the signature process is not performed).

In Step S1, the control unit 110 determines whether or not the own machine-generated email is reply email to the opponent machine-generated email. As a result, when the control unit 110 determines that the own machine-generated email is not reply email to the opponent machine-generated email but new email, the process proceeds to Step S2. In Step S2, the control unit 110 performs the signature process to insert the own machine user's signature SU in the email text of the own machine-generated email. Further, in Step S3, the control unit 110 controls the communication unit 140 to send the own machine-generated email to the opponent machine 200.

In Step S1, when the control unit 110 determines that the own machine-generated email is reply email to the opponent machine-generated email, the process proceeds to Step S4. In Step S4, the control unit 110 checks the signature setting. Further in Step S5, the control unit 110 determines whether or not the signature setting is the first setting. As a result, when the control unit 110 determines that the signature setting is the first setting, the process proceeds to Step S6.

In Step S6, the control unit 110 determines whether or not the original message M2 input in the message input field 31 in the email generation screen 300 contains the own machine user's signature SU. As a result, when the control unit 110 determines that the original message M2 contains the own machine user's signature SU, the process proceeds to Step S3. In this case, the control unit 110 does not perform the signature process.

On the contrary, when the control unit 110 determines that the original message M2 does not contain the own machine user's signature SU in Step S6, the process proceeds to Step S2. In this case, the control unit 110 performs the signature process. After that, the process proceeds to Step S3.

In Step S5, when the control unit 110 determines that the signature setting is not the first setting, the process proceeds to Step S7. In Step S7, the control unit 110 determines whether or not the signature setting is the second setting. As a result, when the control unit 110 determines that the signature setting is the second setting, the process proceeds to Step S8. In Step S8, the control unit 110 determines the number of reply times of sending the own machine-generated email as reply email to the opponent machine 200.

Further in Step S9, the control unit 110 determines whether or not the number of reply times will become an integral multiple of a predetermined number that is two or more after this time reply to the opponent machine 200. As a result, when the control unit 110 determines that the number of reply times becomes an integral multiple of a predetermined number that is two or more, the process proceeds to Step S2. In other words, in this case, the control unit 110 performs the signature process regardless that the original message M2 contains the own machine user's signature SU or not.

On the contrary, when the control unit 110 determines that the number of reply times will not become an integral multiple of a predetermined number that is two or more in Step S9, the process proceeds to Step S6. In Step S6, the control unit 110 does not perform the signature process (the process proceeds from Step S6 to Step S3) when the original message M2 contains the own machine user's signature SU, while it performs the signature process (the process proceeds from Step S6 to Step S2) when the original message M2 does not contain the own machine user's signature SU.

When the control unit 110 determines that the signature setting is not the second setting in Step S7, the process proceeds to Step S10. In Step S10, the control unit 110 determines whether or not the signature setting is the third setting. As a result, when the control unit 110 determines that the signature setting is the third setting, the process proceeds to Step S11. In Step S11, the control unit 110 determines the number of lines in the original message M2 input in the message input field 31 of the email generation screen 300.

Further in Step S12, the control unit 110 determines whether or not the number of lines in the original message M2 is a predetermined threshold value or more. As a result, when the control unit 110 determines that the number of lines in the original message M2 is the predetermined threshold value or more, the process proceeds to Step S2. In other words, in this case, the control unit 110 performs the signature process regardless that the original message M2 contains the own machine user's signature SU or not.

On the contrary, when the control unit 110 determines that the number of lines in the original message M2 is less than the predetermined threshold value in Step S12, the process proceeds to Step S6. In Step S6, the control unit 110 does not perform the signature process (the process proceeds from Step S6 to Step S3) when the original message M2 contains the own machine user's signature SU, while it performs the signature process (the process proceeds from Step S6 to Step S2) when the original message M2 does not contain the own machine user's signature SU.

When the control unit 110 determines that the signature setting is not the third setting in Step S10, the signature setting is the fourth setting, and hence the process proceeds from Step S11 to Step S2. In this case, the control unit 110 performs the signature process regardless that the original message M2 contains the own machine user's signature SU or not.

In the structure in which the communication apparatus 100 performs the first email generation process, as described above, the control unit 110 determines whether or not to perform the signature process on the basis of whether or not the original message M2 input in the message input field 31 of the email generation screen 300 contains the own machine user's signature SU.

In case where the signature setting is the first setting, the control unit 110 performs the signature process when the original message M2 does not contain the own machine user's signature SU, while it does not perform the signature process when the original message M2 contains the own machine user's signature SU. In other words, when the original message M2 part of the email text of the own machine-generated email (reply email) already contains the own machine user's signature SU, the own machine user's signature SU is not newly inserted in the email text of the own machine-generated email. Therefore, it is possible to suppress an increase in the number of lines in the email text of the reply email. In this way, it is possible to prevent readability of the reply email from being deteriorated. In addition, it is also possible to suppress an increase in data amount of the reply email.

Note that the signature process is omitted only when the original message M2 part of the email text of the own machine-generated email already contains the own machine user's signature SU. Therefore, there is no inconvenience that the own machine-generated email is sent to the opponent machine 200 without the own machine user's signature SU in the email text of the own machine-generated email.

Here, in case where the signature setting is the first setting, after the own machine-generated email is sent (replied) first to the opponent machine 200, when the own machine-generated email is replied to the opponent machine 200 as the reply email, the own machine user's signature SU is contained in a part of the original message M2 showing content of the own machine-generated email sent first to the opponent machine 200, and hence the control unit 110 does not perform the signature process. Therefore, in order that the user of the opponent machine 200 may check the own machine user's signature SU, it is necessary to search the original message M2 for the own machine user's signature SU. When the number of lines in the original message M2 is small, the own machine user's signature SU will be found soon. However, when the reply to the opponent machine 200 is repeated many times, the number of lines in the original message M2 is increased, and hence it is burdensome to search the original message M2 for the own machine user's signature SU. For this reason, the second setting and the third setting are prepared as the signature setting.

When the signature setting is the second setting, the control unit 110 determines the number of reply times of sending the own machine-generated email as reply email to the opponent machine 200. When the determined number of reply times is an integral multiple of a predetermined number that is two or more, even if the original message M2 input in the message input field 31 contains the own machine user's signature SU, the control unit 110 performs the signature process so as to insert the own machine user's signature SU above the original message M2. In addition, when the signature setting is the third setting, the control unit 110 determines the number of lines in the original message M2 input in the message input field 31. When the determined number of lines is a predetermined threshold value or more, even if the original message M2 contains the own machine user's signature SU, the control unit 110 performs the signature process so as to insert the own machine user's signature above the original message M2.

In other words, in case where the signature setting is the second setting or the third setting, when the number of lines in the original message M2 is increased due to repeated replying to the opponent machine 200 many times, the signature of the own machine user SU is inserted above the original message M2. In this way, it is not necessary to search the original message M2 for the own machine user's signature SU, and hence convenience of the user of the opponent machine 200 is improved.

<Second Email Generation Process>

When the control unit 110 performs the second email generation process, it determines whether or not the original message M2 input in the message input field 31 contains the own machine user's signature SU. Further, when the original message M2 does not contain the own machine user's signature SU, the control unit 110 performs the signature process so as to insert the own machine user's signature SU in the email text of the own machine-generated email. In this case, the control unit 110 inserts the own machine user's signature SU above the original message M2.

On the contrary, when the original message M2 contains the own machine user's signature SU, the control unit 110 deletes the own machine user's signature SU contained in the original message M2. Further, the control unit 110 performs the signature process so as to newly insert the own machine user's signature SU in the email text of the own machine-generated email. In this case, the control unit 110 inserts the own machine user's signature SU above the original message M2. In this case, only one own machine user's signature SU is contained in the email text of the own machine-generated email (the original message M2 does not contain the own machine user's signature SU).

Hereinafter, with reference to the flowchart shown in FIG. 10, a flow of the second email generation process is described. The flowchart shown in FIG. 10 starts when the send button B31 in the email generation screen 300 is operated (when the email generation process is started). It is supposed that the ON/OFF setting of the signature insertion function is set to ON at the time point when the flowchart shown in FIG. 10 starts. When the ON/OFF selling of the signature insertion function is set to OFF, the process according to the flowchart shown in FIG. 10 is not performed (the signature process is not performed).

Figure 10:
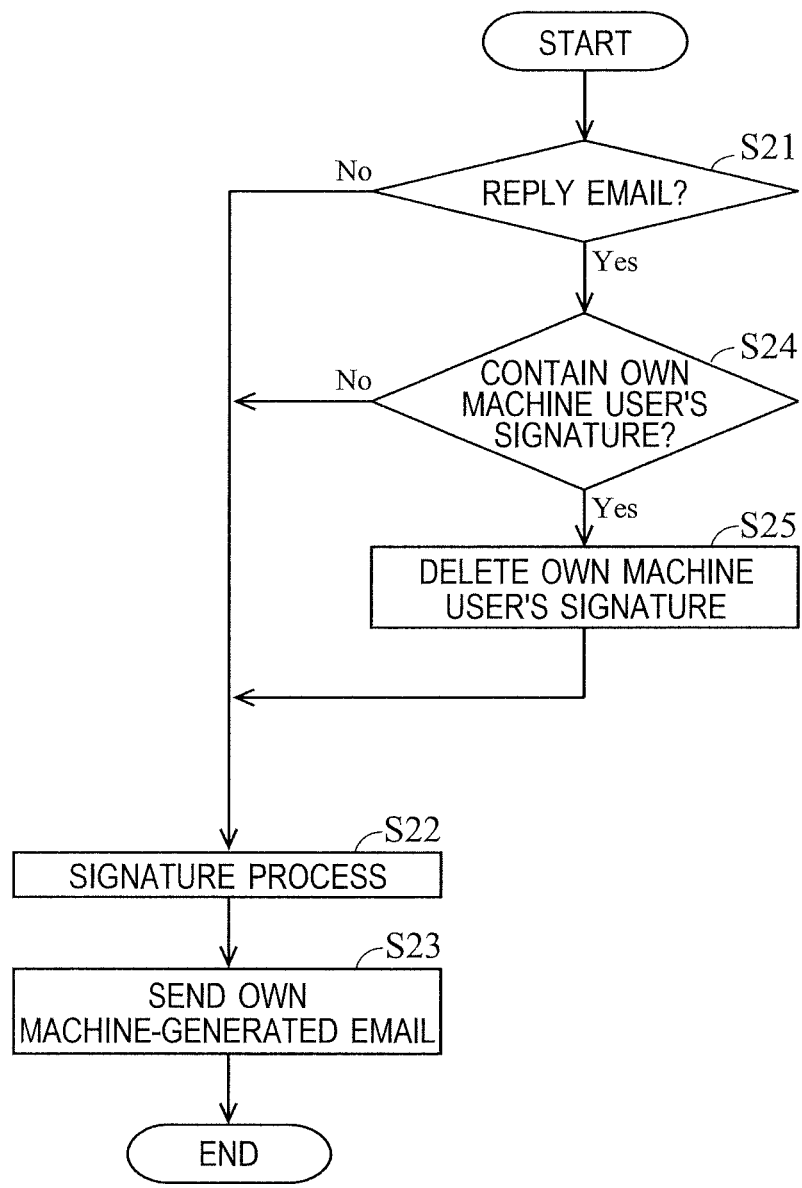
FIG. 10 is a flowchart showing a process flow when the communication apparatus according to an embodiment of the present disclosure performs a second email generation process.

Note that the processes of Steps S21, S22, and S23 shown in FIG. 10 are respectively the same as the processes of Steps S1, S2, and S3 shown in FIG. 9. Therefore, the description of Steps S21 to S23 shown in FIG. 10 is omitted because the description of Steps S1 to S3 shown in FIG. 9 can be quoted.

In Step S21, when the control unit 110 determines that the own machine-generated email is reply email to the opponent machine-generated email, the process proceeds to Step S24. In Step S24, the control unit 110 determines whether or not the original message M2 input in the message input field 31 of the email generation screen 300 contains the own machine user's signature SU. As a result, when the control unit 110 determines that the original message M2 does not contain the own machine user's signature SU, the process proceeds to Step S22.

On the contrary, in Step S24, when the control unit 110 determines that the original message M2 contains the own machine user's signature SU, the process proceeds to Step S25. In Step S25, the control unit 110 deletes the own machine user's signature SU contained in the original message M2. After that, the process proceeds to Step S22. In other words, the control unit 110 deletes the own machine user's signature SU contained in the original message M2 and newly inserts the own machine user's signature SU above the original message M2.

In the structure in which the communication apparatus 100 performs the second email generation process, as described above, the signature process is performed regardless that the original message M2 part of the email text of the own machine-generated email (reply email) contains the own machine user's signature SU or not. However, when the original message M2 part of the email text of the own machine-generated email contains the own machine user's signature SU, the signature SU is deleted. Therefore, it is possible to suppress an increase in the number of lines in the email text of the reply email. In this way, it is possible to prevent readability of the reply email from being deteriorated. In addition, it is also possible to suppress an increase in data amount of the reply email. Further, because the own machine user's signature SU is inserted above the original message M2 in the email text of the own machine-generated email, the user of the opponent machine 200 can easily find the own machine user's signature SU, and thus good convenience can be obtained.

<Signature Corresponding to Destination>

The control unit 110 controls the operation display unit 120 to accept registration of destination to which the own machine-generated email is sent. The destination that the operation display unit 120 has accepted to register is stored in the storage unit 130. In this way, in case where the destination is registered, when the destination is input in the destination input field 32 of the email generation screen 300, the destination that is registered (hereinafter referred to as a registered destination) is displayed as an input candidate. After that, only by selecting a desired destination from the registered destinations displayed as input candidates, the selected registered destination is input in the destination input field 32.

In addition, the control unit 110 sets the own machine user's signature SU to be associated with each of the registered destinations. For example, the control unit 110 controls the operation display unit 120 to accept selection of the signature SU to be associated with the registered destination. Then, the control unit 110 sets the signature SU selected by the own machine user as the signature SU to be associated with the registered destination. Information in which the own machine user's signatures SU respectively associated with the registered destinations is stored in the storage unit 130 as the signature information by destination 501.

Figure 11:
FIG. 11 is a table showing signature information by destination stored in the communication apparatus according to an embodiment of the present disclosure.

In addition, in the signature information by destination 501, as shown in FIG. 11, a priority order corresponding to the registered destination is defined for each of the registered destination (email address domain). The operation display unit 120 receives setting of the priority order of the registered destination from the own machine user.

Further, when performing the signature process, the control unit 110 recognizes the destination input in the destination input field 32 and determines whether or not the recognized destination is the registered destination defined by the signature information by destination 501. As a result, when the destination input in the destination input field 32 is the registered destination (the destination associated with the own machine user's signature SU), the control unit 110 inserts the own machine user's signature SU corresponding to the registered destination input in the destination input field 32, in the email text of the own machine-generated email.

In addition, when a plurality of registered destinations are input in the destination input field 32, the control unit 110 determines the registered destination having highest priority order indicated by the signature information by destination 501 among the plurality of registered destinations input in the destination input field 32. Then, the control unit 110 inserts the own machine user's signature SU corresponding to the determined registered destination in the email text of the own machine-generated email.

For example, in the example shown in FIG. 11, when only email address "BBBB@BBB.com" is input in the destination input field 32, "signature B" is inserted in the email text of the own machine-generated email. In addition, when two email addresses "AAAA@AAA.co.jp" and "BBBB@BBB.com" are input in the destination input field 32, "signature A" is inserted in the email text of the own machine-generated email.

Figure 12:
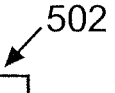
FIG. 12 is a table showing target input field information stored in the communication apparatus according to an embodiment of the present disclosure.

In addition, the storage unit 130 stores the target input field information 502 (see FIG. 12), which indicates a target input field determined as the input field to refer to when performing the signature process among the plurality of input fields (the To field, the Cc field, and the Bcc field) as the destination input fields 32. The operation display unit 120 receives setting of the target input field from the own machine user (the own machine user sets the target input field).

Further, when the control unit 110 performs the signature process, in case where the registered destination is input in the target input field, the control unit 110 inserts the own machine user's signature SU corresponding to the registered destination input in the target input field, in the email text of the own machine-generated email. For example, it is supposed that the registered destination is input in each of the To field and the Cc field, and that only the To field out of the To field and the Cc field is set to the target input field. In this case, even if the registered destination input in the Cc field has higher priority order than the registered destination input in the To field, because the Cc field is not set to the target input field, the own machine user's signature SU corresponding to the registered destination input in the To field is inserted in the email text of the own machine email. Note that when a plurality of registered destinations are input in the To field, the own machine user's signature corresponding to the registered destination having highest priority order indicated in the signature information by destination 501 among the plurality of registered destinations input in the To field is inserted in the email text of the own machine email.

Figure 13:
FIG. 13 is a table showing input field order information stored in the communication apparatus according to an embodiment of the present disclosure.

In addition, the storage unit 130 stores the input field order information 503 (see FIG. 13), which defines the priority order of the plurality of input fields (the To field, the Cc field, and the Bcc field). The operation display unit 120 receives the setting of the priority order of the plurality of input fields from the own machine user (the own machine user sets the priority order of the plurality of input fields).

Further, when the control unit 110 performs the signature process, in case where two or more target input fields exist and the registered destination is input in each of the two or more target input fields, the control unit 110 inserts the own machine user's signature SU corresponding to the registered destination input in the target input field having highest priority order shown in the input field order information 503 among the two or more target input fields, in the email text of the own machine-generated email. For example, it is supposed that the registered destination is input in each of the To field and the Cc field, and that the To field and the Cc field are both set to the target input field. In this case, the own machine user's signature SU corresponding to the registered destination input in the input field having higher priority order out of the To field and the Cc field is inserted in the email text of the own machine email.

In this embodiment, as described above, in case where the registered destination is input in the destination input field 32, when performing the signature process, the control unit 110 inserts the own machine user's signature SU corresponding to the registered destination input in the destination input field 32, in the email text of the own machine-generated email. In this way, the signature SU that is automatically inserted in the email text of the own machine-generated email can be switched for each of the destinations of the own machine-generated email, and hence convenience of the user is improved.

In addition, when a plurality of registered destinations are input in the destination input field 32, the control unit 110 inserts the own machine user's signature SU corresponding to the registered destination having highest priority order among the plurality of registered destinations input in the destination input field 32, in the email text of the own machine-generated email. In this way, it is possible to prevent an inappropriate signature from being inserted in the own machine-generated email. For example, when registering external person's email address such as customers' address (address outside the company) and internal person's email address (address inside the company), the priority order of the address outside the company is set higher than the priority order of the address inside the company. Then, when the address outside the company and the address inside the company are input as destinations of the own machine-generated email, a signature for external use (signature SU corresponding to address outside the company) is inserted in the own machine-generated email. Therefore, it is possible to prevent a signature for internal use (signature SU corresponding to the address inside the company) from being erroneously inserted in the own machine-generated email to be sent to an external person.

In addition, when the registered destination is input in the target input field among a plurality of input fields (the To field, the Cc field, and the Bcc field) as the destination input field 32, the control unit 110 insert the own machine user's signature SU corresponding to the registered destination input in the target input field, in the email text of the own machine email. In this way, for example, in order to insert the signature SU corresponding to the destination input in the To field, in the own machine-generated email, only the To field is set to the target input field. Then, even if the destination is input in the Cc field or the Bcc field, it is possible to prevent the signature SU corresponding to the destination input in the Cc field or the Bcc field from being inserted in the own machine-generated email.

In addition, when two or more target input fields exist and the registered destination is input in each of the two or more target input fields, the control unit 110 inserts the own machine user's signature SU corresponding to the registered destination input in the target input field having highest priority order shown in the input field order information 503 out of the two or more target input fields, in the email text of the own machine-generated email. For example, some users may want to insert the signature SU corresponding to the destination input in the Cc field in the own machine-generated email when the destination is input in both the To field and the Cc field, and to insert the signature SU corresponding to the destination input in the To field in the own machine-generated email when the destination is not input in the Cc field. In this case, the To field and the Cc field should be both set to the target input field, and the priority of the Cc field should be higher than the priority of the To field.

The embodiment described in this specification is merely an example in every aspect and should not be interpreted as a limitation. The scope of the present disclosure is defined not by the above description of the embodiment but by the claims, and should be understood to include all modifications within the meaning and the scope equivalent to the claims.

What is claimed is:

1. A communication apparatus comprising:
a storage unit for storing an own machine user's signature registered in advance;
a communication unit for receiving opponent machine-generated email sent from an opponent machine;
an operation display unit for displaying an email generation screen containing content of the opponent machine-generated email as an original message input in a message input field when receiving an instruction to generate reply email to the opponent machine-generated email, and for receiving an operation to input a new message in the message input field; and
a control unit for performing an email generation process to generate own machine-generated email containing email text of the message input in the message input field, and for controlling the communication unit to send the own machine-generated email to the opponent machine, wherein
when performing the email generation process, the control unit determines whether or not the original message input in the message input field contains the own machine user's signature, and performs a signature process to insert the own machine user's signature in the email text of the own machine-generated email in case where the original message does not contain the own machine user's signature, while it does not perform the signature process in case where the original message contains the own machine user's signature, the operation display unit displays a destination input field in the email generation screen and accepts an operation to input a destination of the own machine-generated email in the destination input field, the storage unit stores registered destinations registered by the own machine user and stores signature information by destination in which the own machine user's signature is defined for each of the registered destinations, in case where the registered destination is input in the destination input field, when performing the signature process, the control unit inserts the own machine user's signature corresponding to the registered destination input in the destination input field, in the email text of the own machine-generated email, a priority order corresponding to the registered destination is determined for each of the registered destinations in the signature information by destination, when a plurality of the registered destinations are input in the destination input field, the control unit inserts the own machine user's signature corresponding to the registered destination having highest priority order shown in the signature information by destination among the plurality of registered destinations input in the destination input field, in the email text of the own machine-generated email, the operation display unit displays the email generation screen in which a plurality of input fields respectively corresponding to a plurality of destination types including To, Cc, and Bcc are arranged as the destination input fields, the storage unit stores target input field information indicating target input fields set as input fields to refer to when performing the signature process among the plurality of input fields, the operation display unit receives setting of the target input fields from the own machine user, in case where a plurality of the registered destinations are input in the target input field, the control unit inserts the own machine user's signature corresponding to the registered destination having highest priority order indicated in the signature information by destination among the plurality of registered destinations input in the target input field, in the email text of the own machine-generated email, and in case where the registered destinations are input respectively in the target input field and the input field other than the target input field, even if the registered destination input in the input field other than the target input field has higher priority order than the registered destination input in the target input field, the control unit inserts the own machine user's signature corresponding to the registered destination input in the target input field, in the email text of the own machine-generated email.

2. The communication apparatus according to claim 1, wherein the control unit determines the number of reply times of sending the own machine-generated email as reply email to the opponent machine, and when the number of reply times is an integral multiple of a predetermined number that is two or more, the control unit performs the signature process so as to insert the own machine user's signature above the original message even if the original message input in the message input field contains the own machine user's signature.

3. The communication apparatus according to claim 1, wherein the control unit determines the number of lines in the original message input in the message input field, and when the number of lines is a predetermined threshold value or more, the control unit performs the signature process so as to insert the own machine user's signature above the original message even if the original message contains the own machine user's signature.

4. The communication apparatus according to claim 1, wherein the storage unit stores input field order information defining priority orders of the plurality of input fields, and when two or more target input fields exist and the registered destination is input in each of the two or more target input fields, the control unit inserts the own machine user's signature corresponding to the registered destination input in the target input field having highest priority order shown in the input field order information among the two or more target input fields, in the email text of the own machine-generated email.

5. A communication apparatus comprising:

a storage unit for storing an own machine user's signature registered in advance;

a communication unit for receiving opponent machine-generated email sent from an opponent machine;

an operation display unit for displaying an email generation screen containing content of the opponent machine-generated email as an original message input in a message input field when receiving an instruction to generate reply email to the opponent machine-generated email, and for receiving an operation to input a new message in the message input field; and a control unit for performing an email generation process to generate own machine-generated email containing email text of the message input in the message input field, and for controlling the communication unit to send the own machine-generated email to the opponent machine, wherein when performing the email generation process, the control unit determines whether or not the original message input in the message input field contains the own machine user's signature, and performs a signature process to insert the own machine user's signature above the original message in the email text of the own machine-generated email in case where the original message does not contain the own machine user's signature, while it deletes the own machine user's signature contained in the original message and performs the signature process in case where the original message contains the own machine user's signature, the operation display unit displays a destination input field in the email generation screen and accepts an operation to input a destination of the own machine-generated email in the destination input field, the storage unit stores registered destinations registered by the own machine user and stores signature information by destination in which the own machine user's signature is defined for each of the registered destinations, in case where the registered destination is input in the destination input field, when performing the signature process, the control unit inserts the own machine user's signature corresponding to the registered destination input in the destination input field, in the email text of the own machine-generated email, a priority order corresponding to the registered destination is determined for each of the registered destinations in the signature information by destination, when a plurality of the registered destinations are input in the destination input field, the control unit inserts the own machine user's signature corresponding to the registered destination having highest priority order shown in the signature information by destination among the plurality of registered destinations input in the destination input field, in the email text of the own machine-generated email, the operation display unit displays the email generation screen in which a plurality of input fields respectively corresponding to a plurality of destination types including To, Cc, and Bcc are arranged as the destination input fields, the storage unit stores target input field information indicating target input fields set as input fields to refer to when performing the signature, process among the plurality of input fields, the operation display unit receives setting of the target input fields from the own machine user, in case where a plurality of the registered destinations are input in the target input field, the control unit inserts the own machine user's signature corresponding to the registered destination having highest priority order indicated in the signature information by destination among the plurality of registered destinations input in the target input field, in the email text of the own machine-generated email, and in case where the registered destinations are input respectively in the target input field and the input field other than the target input field, even if the registered destination input in the input field other than the target input field has higher priority order than the registered destination input in the target input field, the control unit inserts the own machine user's signature corresponding to the registered destination input in the target input field, in the email text of the own machine-generated email.

* * * * *